United States Patent
Yaramchitti et al.

(10) Patent No.: US 10,278,063 B2
(45) Date of Patent: *Apr. 30, 2019

(54) APPARATUS AND METHOD OF LOCAL PROFILE ASSISTANT EUICC LOGGING

(71) Applicant: Verizon Patent and Licensing Inc., Basking Ridge, NJ (US)

(72) Inventors: Jogendra Yaramchitti, Somerville, NJ (US); Ravikumar Pattabiraman, Hillsborough, NJ (US); Christopher M Schmidt, Branchburg, NJ (US); Krishna Pichumani Iyer, Basking Ridge, NJ (US); Ye Ouyang, Piscataway, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,833

(22) Filed: Jun. 25, 2018

(65) Prior Publication Data

US 2018/0310165 A1  Oct. 25, 2018

Related U.S. Application Data

(63) Continuation of application No. 15/452,725, filed on Mar. 7, 2017, now Pat. No. 10,034,166.

(51) Int. Cl.
| | |
|---|---|
| *H04M 3/00* | (2006.01) |
| *H04W 8/22* | (2009.01) |
| *G06F 11/30* | (2006.01) |
| *G06F 11/34* | (2006.01) |
| *G06F 9/451* | (2018.01) |

(52) U.S. Cl.
CPC ............. *H04W 8/22* (2013.01); *G06F 9/451* (2018.02); *G06F 11/3006* (2013.01); *G06F 11/3476* (2013.01)

(58) Field of Classification Search
CPC .... H04W 8/22; G06F 11/3476; G06F 9/4443; G06F 11/3006
USPC ........................................................ 455/419
See application file for complete search history.

(56) References Cited

U.S. PATENT DOCUMENTS

| | | | |
|---|---|---|---|
| 9,843,885 B2* | 12/2017 | Yerrabommanahalli | ..................... H04W 4/003 |
| 10,034,166 B1* | 7/2018 | Yaramchitti | ............ H04W 8/22 |
| 2016/0330608 A1* | 11/2016 | Benn | ..................... H04W 8/183 |
| 2017/0048645 A1* | 2/2017 | Yerrabommanahalli | ..................... H04L 61/106 |
| 2017/0094597 A1* | 3/2017 | Su | ..................... H04W 52/0209 |

FOREIGN PATENT DOCUMENTS

GB  2522044 A  7/2015

OTHER PUBLICATIONS

GSMA Embedded SIM Solution Specification, GSMA Embedded SIM Remote Provisioning Architecture, Version 1.1, 17(Dec. 2013).

* cited by examiner

*Primary Examiner* — Amancio Gonzalez

(57) ABSTRACT

A wireless companion device that supports an Embedded Universal Integrated Circuit Card receives a logging request from a wireless communication device. The wireless companion device applies to a remote provisioning server for logging information that corresponds to remote provisioning of the eUICC. The wireless companion device receives the logging information and routes at least a portion to the wireless communication device.

20 Claims, 11 Drawing Sheets

US 10,278,063 B2

APPARATUS AND METHOD OF LOCAL PROFILE ASSISTANT EUICC LOGGING

CROSS-REFERENCES TO RELATED APPLICATIONS

This application is a continuation of U.S. application Ser. No. 15/452,725, entitled "APPARATUS AND METHOD OF LOCAL PROFILE ASSISTANT eUICC LOGGING", filed on Mar. 7, 2017, the entirety of which is incorporated by reference herein.

BACKGROUND

A Subscriber Identity Module (SIM) card is a removable circuit card for use in wireless communication devices, which stores authentication data and information identifying the device to a mobile network. A SIM card, though, allows access to only one wireless network operator. In other words, the SIM card is "locked" to one operator, and to access another wireless network operator the device user must replace the current SIM card with a SIM card configured for that other operator.

An Embedded Universal Integrated Circuit Card (eUICC) differs from a SIM in that it is not removable, and instead can be reconfigured or "provisioned" to allow access to different wireless network operators.

Architectures and functionalities of eUICCs are set forth in GSMA Embedded SIM Solution Specification, GSMA Embedded SIM Remote Provisioning Architecture, Version 1.1, 17 (December 2013), the disclosure of which is hereby incorporated herein in its entirety by reference.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 11A-11G illustrate graphic arrangement for displaying exemplary logging of KPIs, profile and other information relating to remote provisioning of eUICCs in wireless companion devices, wherein:

FIG. 11A illustrates example graphic arrangement for displaying, on a primary wireless communication device, exemplary logging data and information associated with remote provisioning an eUICC of a wireless companion device, in an exemplary process associated with eUICC remote provisioning logging, in systems and methods according to various implementations.

FIG. 11B illustrates one example graphic arrangement for displaying, on the primary wireless communication device, exemplary logging of KPIs and other information associated with remote provisioning the wireless companion device eUICC, in association with a non-active profile, in an exemplary process associated with eUICC remote provisioning logging, in systems and methods according to various implementations.

FIG. 11C illustrates one example graphic arrangement for displaying, on the primary wireless communication device, exemplary logging of real time KPIs and other real-time information associated with remote provisioning the wireless companion device eUICC, in association with a non-active profile, in an exemplary process associated with eUICC remote provisioning logging, in systems and methods according to various implementations.

FIG. 11D illustrates one example graphic arrangement for displaying exemplary logging of data associated with an example downloading of a profile, in an exemplary process associated with eUICC remote provisioning logging, in systems and methods according to various implementations.

FIG. 11E illustrates one example graphic arrangement in a graphical user interface, on a primary wireless communication device, in a process providing user-controlled disabling of a currently active profile on an eUICC, in an exemplary process associated with eUICC remote provisioning logging, in systems and methods according to various implementations.

FIG. 11F illustrates one example graphic arrangement in a graphical user interface, on a primary wireless communication device, in a process providing user-controlled selection and entry of an activation code for activating a profile, in an exemplary process associated with eUICC remote provisioning logging, in systems and methods according to various implementations.

FIG. 11G illustrates one example graphic arrangement in a graphical user interface, on a primary wireless communication device, indicating a state of no profiles yet provisioned on a virtual SIM card of the primary device's wireless companion device, in an exemplary process associated with eUICC remote provisioning logging, in systems and methods according to various implementations.

DETAILED DESCRIPTION

Figure 1:
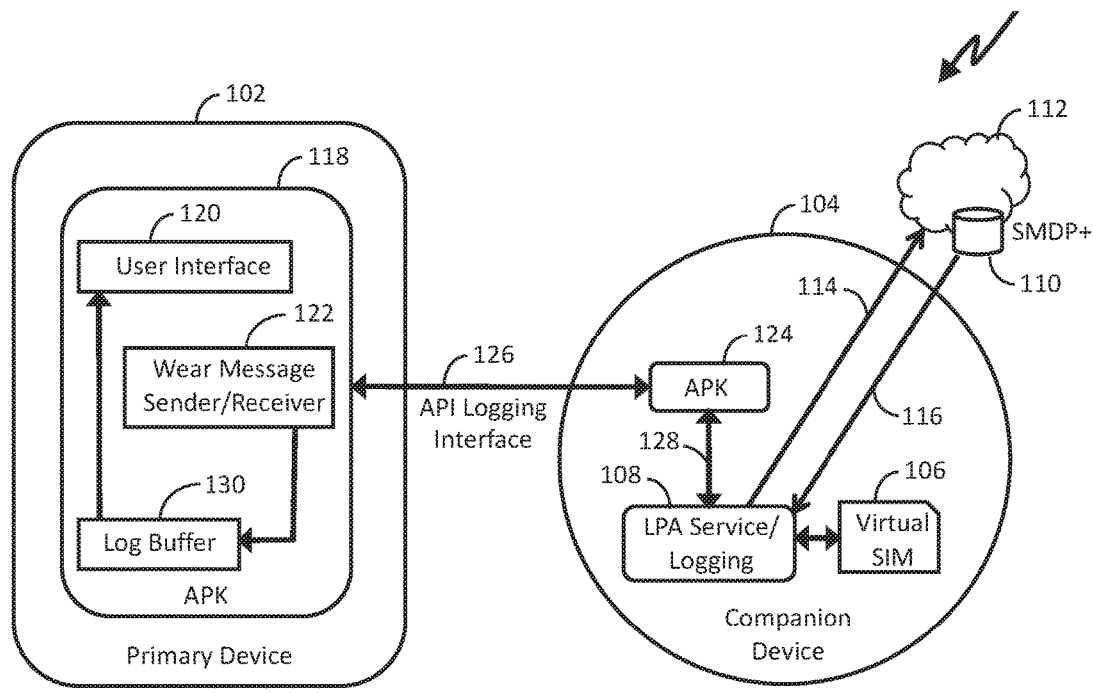
FIG. 1 a simplified diagram illustrating one exemplary architecture in an example virtual SIM card local provisioning logging system according to implementations.

In the following detailed description, numerous specific details are set forth by way of examples to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

Configuring, testing and verifying remote provisioning operation of new eUICC equipped devices to ensure capability to access one, and to access selected ones among a plurality of mobile network operators (MNOs) can exhibit and present range of technical problems. Using current techniques, there can be further problems in diagnosing the problems, as such techniques lack capability to inspect and record many of the events, for example, transmitted and received parameter values, state flags, and event reports that can be generated and communicated during remote provisioning processes.

Disclosed technical solutions to the above-described technical problems include logging of flags, parameters, and other indicators of events and information generated, or communicated, during remote provisioning of eUICCs, and indicative of performances of different steps and operations, during the provisioning, at each of a plurality of different locations and resources within the system. Technical solutions include enabling and applying logging of flags, parameters, and other indicators (hereinafter, collectively, "provisioning parameters and indicators") generated or communicated during remote provisioning of eUICC, which have sufficient correlation to performances, including particular completions and failures in the provisioning, to provide substantial reduction in estimated average troubleshooting time over current troubleshooting techniques. Technical solutions include enabling and applying logging of a larger range of particular provisioning parameters and indicators which, in turn, can provide diagnosis of a significantly larger range of technical eUICC provisioning problems than current troubleshooting techniques can generally identify. Further technical solutions and benefits provided by disclosed methods and systems of logging provisioning parameters and indicators include enabling of testing and verifying a breadth and depth of eUICC provisioning operations on representative samples of untested eUICC-equipped devices, to establish with a given confidence that such eUICC equipped devices, when deployed in larger quantities, will meet a given maximum acceptable failure rate.

Implementations can include a primary mobile communication device, such as a smartphone, linked by a local wireless communication link such as Bluetooth to a companion device, such as a smartwatch. The primary mobile communication device can be configured to access a mobile network operator (MNO), such as a cellular network provider, through a cellular link. In an implementation, the companion device can include an eUICC and an eUICC provisioning module, which can be configured to perform or manage, at least in part, a remote provisioning of the eUICC. In an implementation, the eUICC provisioning module or other logic or modules of the companion device can be configured to log various parameter values and events occurring in the remote provisioning process. For convenience these parameter values and events will be alternatively referred to herein by the arbitrarily selected labels "key parameter indicators" or its abbreviation "KPI." It will be understood that these labels, as used within this disclosure, have no intrinsic meaning. Example KPIs can include commands, status flags, encryption/decryption keys, and various identifiers associated with or indicative of a status of operations in the eUICC remote provisioning. Other example KPIs, and groupings of KPIs, are described in greater detail later in this disclosure.

In an implementation, the wireless companion device can be configured to send to the primary wireless communication device, for example in response to receiving a logging command from that primary device, selectable logs of one or more of such KPIs. The primary wireless communication device can be configured to include a logging buffer, which can be configured to log certain of the KPI, e.g., status flags, encryption/decryption keys, and other parameters associated with or indicative of a status of provisioning of the eUICC. In an implementation, the primary wireless communication device can be configured to receive user-entered logging commands for configuring, for example, logging operations and the display of logging results. Features and benefits of such user-controllable logging can include collecting real-time provisioning data, local to each of a plurality of primary wireless communication devices, without needing to add, delete or update profiles stored on a eUICC of that primary device.

FIG. 1 illustrates a simplified diagram 100 of a system of features of one system supporting remote provisioning of an eUICC, and logging of various KPIs and other eUICC provisioning-related information according to various implementations. Aspects represented in and illustrated in FIG. 1, will be described. For convenience the aspects will be collectively referenced as "system 100."

Referring to FIG. 1, system 100 can include a primary wireless communication device 102, and a wireless companion device 104 supporting a virtual SIM 106. In an implementation, the virtual SIM 106 can be configured as an eUICC in accordance with various standards and protocols and will therefore be alternatively referred to as "eUICC 106." In an implementation, the wireless companion device 104 can include a logic module such as the Local Profile Assistant (LPA) Service/Logging logic 108, that can be configured to manage and assist in certain processes associated with remote provisioning the eUICC 106, and in logging KPIs and other information associated with the remote provisioning. Exemplary management and assistance operations, in remote provisioning the eUICC 106, and in logging KPIs and other information, can include routing profile download requests to a provisioning server resource, such as the SMDP+ server resource 110, and receiving SMDP+ server resource 110 responses, such as requested provisioning profiles and other information. Other exemplary operations of the LPA Service/Logging logic 108 are described in greater detail later.

Regarding the SMDP+ server resource 110, in accordance with conventional SMDP+ server techniques the SMDP+ server resource 110 can be connected to the Internet 112 or other wide-area network ("WAN") cloud based network, and thereby accessed by one or more MNOs (not explicitly visible in FIG. 1). Associated with the SMDP+ server resource 110 can be communication from the LPA Service/Logging logic 108 to the SMDP+ server resource 110 of profile download requests and other information. Also associated with such access can be a carrying of responses from the SMDP+ server resource 110 to the LPA Service/Logging logic 108. The carrying can be provided, for example, by a communication channel between the LPA Service/Logging logic 108 and the Internet 112. As illustrated in FIG. 1, the communication channel can include a provisioning "uplink" 114 and a provisioning "downlink" 116. For convenience, functionality of the provisioning uplink 114 and provisioning downlink 116 will be collectively referenced as the "remote provisioning server access channel 114/116."

As will be described in greater detail later, the remote provisioning server access channel 114/116 can be carried, for example, at least in part, as a tunnel within a cellular link between the primary wireless communication device 102 and a network base station (not explicitly visible in FIG. 1) of a cellular network provider or MNO (not explicitly visible in FIG. 1). Regarding operations and protocols for filtering, routing and forwarding profile download requests and other information from the provisioning uplink 114, through the Internet 112 to the SMDP+ server resource 110, these can be provided by adaptation of conventional techniques, such as a Subscription Manager Secure Routing (SM-SR) resource. Such techniques are known to persons of ordinary skill in the arts pertaining to this disclosure, and can be readily adapted by such persons having view of this disclosure. Therefore, further detailed description is omitted.

Referring to FIG. 1, in an implementation, a mobile application/client or "mobile APK" 118 can be installed on the primary wireless communication device 102 and can be configured to provide, among other features, a user interface (UI) 120. The UI 120 can be configured to enable user entry of commands associated with various remote provisioning and logging-related processes, and to display logging results to the user. One example implementation of the UI 120 can utilize a touchscreen type graphical user interface (GUI) of the primary wireless communication device 102. In an implementation, the mobile APK 118 can be configured with a sender-receiver, such as the Wear Message Sender/Receiver 122, to communicate remote provisioning and logging commands to the wireless companion device 104. The sender-receiver, e.g., the Wear Message Sender/Receiver 122, and be further configured to receive logging information, and other data from that device 104. The sender-receiver, e.g., Wear Message Sender/Receiver 122, can be configured to utilize, for example, a Bluetooth transceiver or equivalent (not explicitly visible in FIG. 1) in the primary wireless communication device 102.

In an implementation, the system 100 can include an application interface between the mobile APK 118 of the primary wireless communication device 102 and the LPA Service/Logging logic 108 of the wireless companion device 104. For example, an interface APK 124 can be provided in the wireless companion device 104, and can be configured together with the mobile APK 118 of the primary wireless communication device 102 to establish an API Logging Interface 126 between devices 102 and 104, and establish interface 128 between API Logging Interface 126 and LPA Service/Logging logic 108.

Referring to FIG. 1, in an implementation, the mobile APK 118 can be provided with a buffer, for example the log buffer 130, configured to collect, arrange and selectively display, through the UI 120, logging information received from wireless companion device 104.

Figure 2:
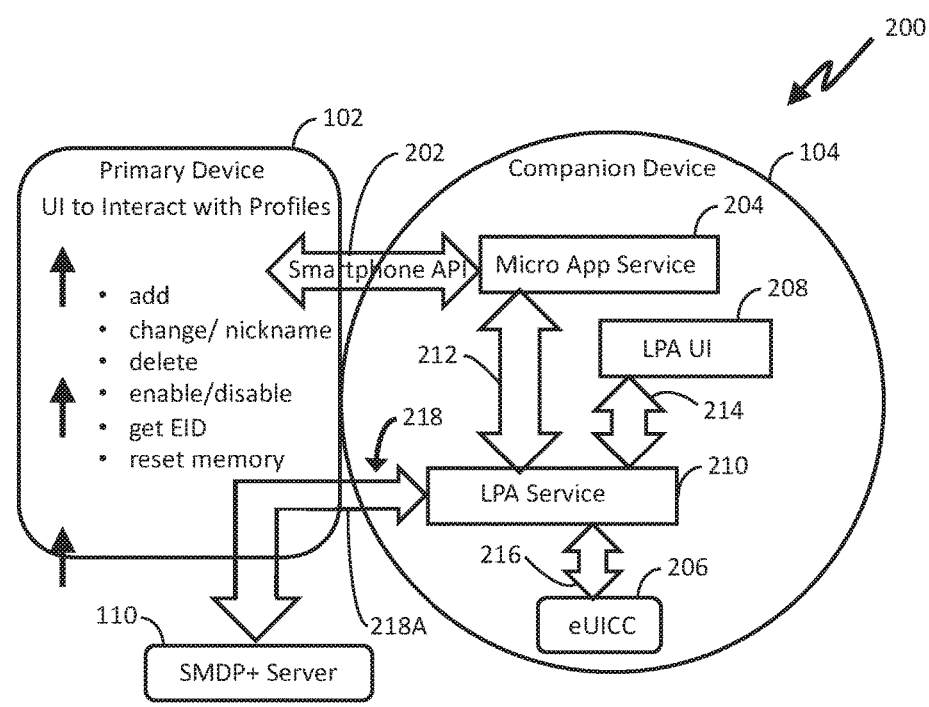
FIG. 2 is an example diagram illustrating example functions in one companion device within one virtual SIM card local provisioning logging system, and in one or more methods according to various implementations.

FIG. 2 shows an example diagram 200 illustrating an exemplary arrangement of the FIG. 1 primary wireless communication device 102 with an example configuration of the FIG. 1 companion device 104, in a remote eUICC provisioning logging system according to various implementations. Certain features illustrated in FIG. 2 can be implementations of certain FIG. 1 features described above, as will be described in greater detail. Description of example implementations in remote eUICC provisioning logging processes and systems will include reference to FIG. 2 in addition to references to FIG. 1. For convenience, such example aspects will be referred to as "system 200."

Referring to FIG. 2, implementations of the system 200 can include the primary wireless communication device 102 and the companion device 104, connected through a smartphone API 202. The smartphone API 202 can be configured to provide or support the FIG. 1 API Logging 126 functionality described above. In an implementation, the companion device 104 can also be configured with an interface to the API 202, such as the example Micro App Service 204. In an implementation, remote provisioning commands communicated over the API 202 can include commands entered by a user of the primary wireless communication device 102, for example through a primary device UI such as the FIG. 1 UI 122 described above. Such commands can include commands for adding, editing, deleting, enabling, and disabling profiles on a companion device eUICC, such as the eUICC 206. In an implementation, logging-related commands can include commands entered by user, for example through the FIG. 1 UI 120 described above, for user control of the primary wireless communication device 102 obtaining and displaying logging information, e.g., KPIs, from the companion device 104 related to remote provisioning the eUICC 206.

Referring to FIG. 2, in an implementation the wireless companion device 104 can be provided with an interface logic, such as the Local Profile Assistant (LPA) UI block 208, configured to interface with certain APIs in the primary wireless communication device 102. The LPA UI block 208 can be implemented, for example, by a first APK in the companion device 104. For purposes of description it will therefore be alternatively referred to as the "first companion device APK" 208. In an implementation, the first companion device APK 208 can be configured to access and receive responses from other LPA APIs, as described in greater detail later. In an implementation, the companion device 104 can be provided with an LPA Service block 210. The LPA Service block 210 can be configured to provide logic for managing certain operations of the companion device 104, including provisioning the eUICC 206, and capturing of real-time logs of information and events occurring in such provisioning. In an aspect, the LPA Service block 210 can be implemented, for example, by a second APK in the companion device and will therefore be alternatively referred to as the "second companion device APK" 210.

With continuing reference to FIG. 2, information and events occurring in provisioning of the eUICC 206 can be carried, for example, as Protocol Data Units (PDUs). Such PDUs can be generated by the LPA Service block 210 and communicated to the eUICC 206 and to various other components of system 200, and can be received from the eUICC 206 and other system 200 components. Examples of companion device 104 remote-provisioning operations that the LPA Service block 210 can manage can include communication between an MNO SMPD+ server, such as the SMDP+ server resource 110, and the eUICC 206. Examples of captured log information, e.g., KPIs, can include SMDP+ events, such as events in the above-described transactions between the eUICC 206 and the SMDP+ server resource 110. In an implementation, the LPA Service block 210 can be further configured to provide APIs to its clients with an AIDL Inter Process Communication (IPC) mechanism.

Referring to FIG. 2, in an implementation, interface between the LPA Service block 210 and the Micro App 204 can be provided by an API 212, which is arbitrarily named for reference in this description as "Wear API 212." The Wear API 212 can be implemented, for example, as an AIDL. Interface between the LPA Service block 210 and the LPA UI block 208 can be provided by a logic path 214. For purposes of description, the logic path 216 will be alternatively referred to as "LPA-eUICC interface" 216.

In an implementation, interface between the LPA Service block 210 and the eUICC 206 can be provided, for example, by LPA-eUICC interface 216. Referring to FIG. 2, interface between the LPA Service block 210 and the SMDP+ server 110 can be provided by LPA-SMDP+ interface 218. In an implementation, the portion 218A of the LPA-SMDP+ interface 218 that extends between the primary wireless communication device 102 and the companion device 104 can be carried on or within the API 202.

Figure 3:
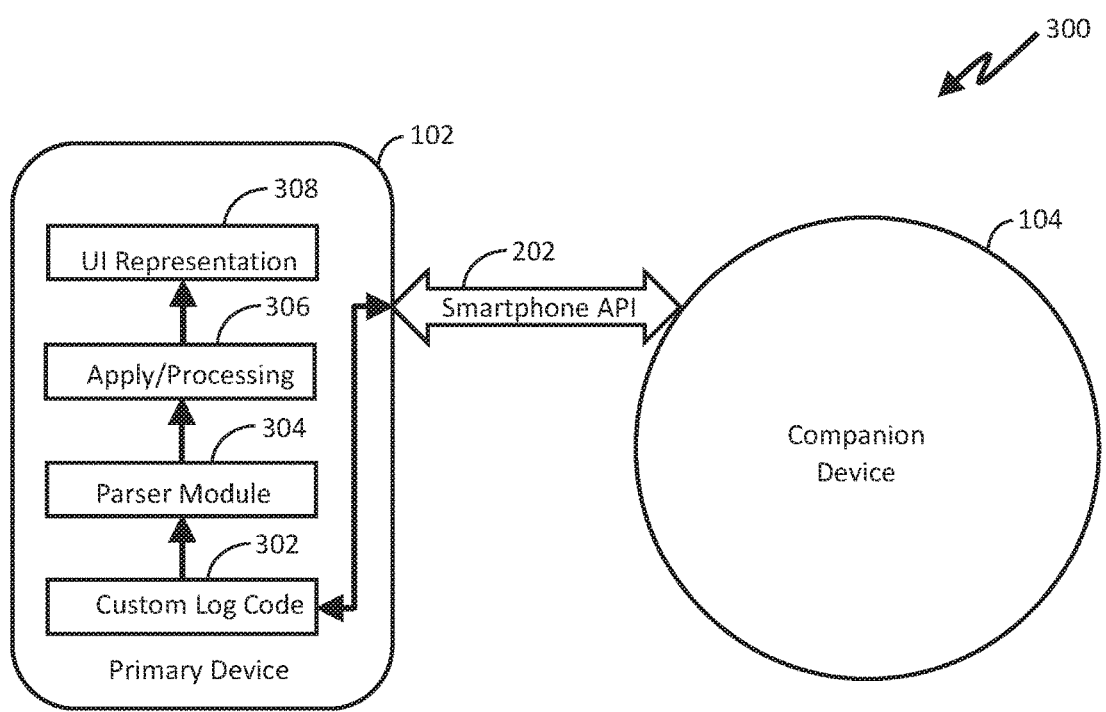
FIG. 3 is a diagram illustrating one exemplary arrangement, and exemplary flow of logging features in one primary wireless device within an example virtual SIM card local provisioning logging system, and in one or more methods according to various implementations.

FIG. 3 shows a diagram 300 illustrating an exemplary configuration of logic modules that can be configured within above-described implementations of the primary wireless device 102, and exemplary flow directions among such blocks and modules, in an example eUICC remote provisioning logging system according to various implementations. Referring to FIG. 3, in an implementation, logging features in the primary wireless communication device 102 can be provided by custom log code 302, parser module 304, processing module 306, and UI representation module 308. In an implementation, the custom log code 302, parser module 304 and processing module 306 can all be implemented as configurations of a programmable processor installed in the primary wireless communication device 102, such as the example device illustrated in FIG. 12 of this disclosure and described in greater detail later. The UI representation module 308 can be implemented, for example, by a display (e.g., touchscreen display) of the FIG. 1 primary wireless communication device 102, in combination with the UI 120 aspect of the mobile APK 118.

Figure 4:
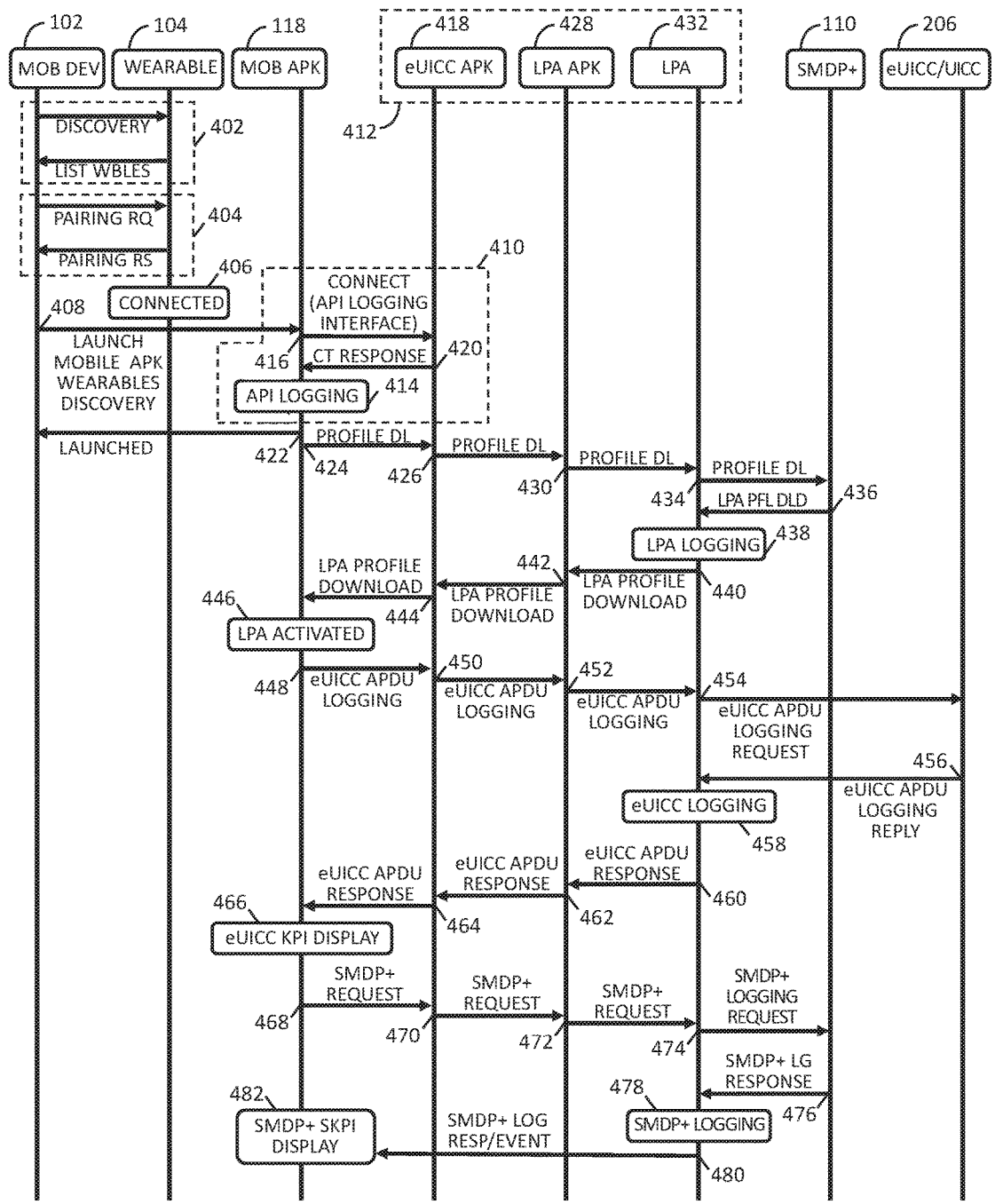
FIG. 4 illustrates an example process in primary wireless communication device operations associated with one or more processes in a virtual SIM card local provisioning logging system and in one or more methods according to various implementations.

FIG. 4 shows a diagram illustrating exemplary flow, hereinafter "FIG. 4 flow," in systems and methods providing eUICC remote provisioning logging in accordance with one or more implementations. For purposes of example, operations are described in reference to the primary wireless communication device 102 and wireless companion device 104, with device 102 implemented as described in reference to FIG. 1 and device 104 implemented as described in reference to FIGS. 1 and 2.

In one example according to the FIG. 4 flow, it will be assumed the primary wireless communication device 102 and wireless companion device(s) 104 have not yet detected one another when, at 402, either automatically (e.g., according to a given schedule) or by a user of the primary wireless communication device 102 entering a command, the device 102 can apply "discovery" operations to detect wireless companion device 104 within range and, based on the detection, construct a list of the devices 104. Examples of the discovery operations can include the primary wireless communication device 102 entering a "listen" or "discover" phase, such as represented by the left-to-right "discover" arrow, detect Bluetooth or equivalent advertisement signals from such devices 104 and, based on the detection(s), construct a list of the wireless companion device(s) 104, such as represented by the right-to-left "List of Wearables" arrow. The primary wireless communication device 102 can be configured to display in association with the discovery at 402, for example through the UI 120, a list identifying the "List of Wearables" and receive (e.g., through the same UI 120) a user selection. Upon the user selection, or through default or other selection, the FIG. 4 flow can proceed to 404 to where the device 102 and the selected wireless companion device 104 can perform cooperative operations establishing the "Connect" state 406. Operations at 404 can apply, for example, conventional Bluetooth "pairing" or other protocol communications to establish the Connected" state 406.

Referring to FIG. 4, after the primary wireless communication device 102 and wireless companion device 104 are in the "Connected" state at 406, the FIG. 4 flow can proceed to 408 and launch the mobile APK 118 of the primary wireless communication device 102. In an aspect, proceeding to 408 can be in response to an event, e.g., the primary wireless communication device 102 receiving through its user interface 120 a user-entered eUICC remote provisioning and logging command. In an implementation, the primary wireless communication device 102 and wireless companion device 104 can be configured to establish, by operations at 410, in association with establishing the Connected state at 406, an application logging interface 414— between the primary wireless device mobile APK 118 and eUICC management logic in wireless companion device 104. FIG. 4 generally represents the eUICC management logic in wireless companion device 10 as "eUICC logic" 412. FIG. 4 shows various routings internal to the eUICC logic 412 that, as will be understood upon reading this disclosure in its entirety, can correspond to certain blocks and block boundaries of the above-described FIG. 1 and FIG. 2 implementations of the wireless companion device 104.

Referring to FIG. 4, example operations in the FIG. 4 flow can include operations at 402-406 establishing a wireless link between the wireless communication device 102 and the wireless companion device 104. FIG. 4 flow operations can include operations at 408 establishing an application/client (APK) in the wireless communication device 104, the APK being the mobile APK 118. FIG. 4 flow operations can also include operations at 410 establishing an API such as the FIG. 1 API logging interface 126 and establishing an eUICC APK 418, such as the FIG. 2 Micro App Service 204, in the wireless companion device 104. Operations in the FIG. 4 flow can also include operations at 426 providing or establishing a local provisioning application (LPA) APK 428 and an LPA 432 implementing, for example, the FIG. 2 LPA Service 210 in the wireless companion device 104, for interfacing to the eUICC APK 418 and to the eUICC 206.

Referring to FIGS. 1, 2, and 4, operations at 410 can be configured to establish the API Logging interface at 414 in a manner implementing the API Logging Interface 126. Operations at 410 can include, for example, a Connect/API Logging Interface communication 416 from the mobile APK 118 to an interface such as represented by "eUICC APK 418" in the wireless companion device 104. Implementation of the eUICC APK 418 can be, or can include, the FIG. 2 Micro App Service 204, and can include functionality of the FIG. 1 APK 124. The eUICC APK 418 (e.g., Micro App Service 204) can be configured, in an aspect, to respond to the Connect/API Logging Interface signal at 416 by sending a "connect response" 420 back to the mobile APK 118. In an aspect, the connect response at 420 can establish the API Logging interface at 414.

The above-described configurations of the primary wireless communication device 102 and the wireless companion device 104, upon connection such as described, can provide and support various operations with respect to remote provisioning the eUICC 206, and logging KPIs and other information associated with such provisioning. KPIs can include LPA related KPIs and other information associated with profile download. Logging features can include requesting LAP-related information from the SMDP+ server 110, e.g., profiles downloaded, and logging SMDP+ responses to the requests.

An implementation providing the above-described tapping of KPI information in SMDP+ server resources will be described in reference to FIG. 5. Various exemplary operations will then be described in reference to FIGS. 4 and 5.

Figure 5:
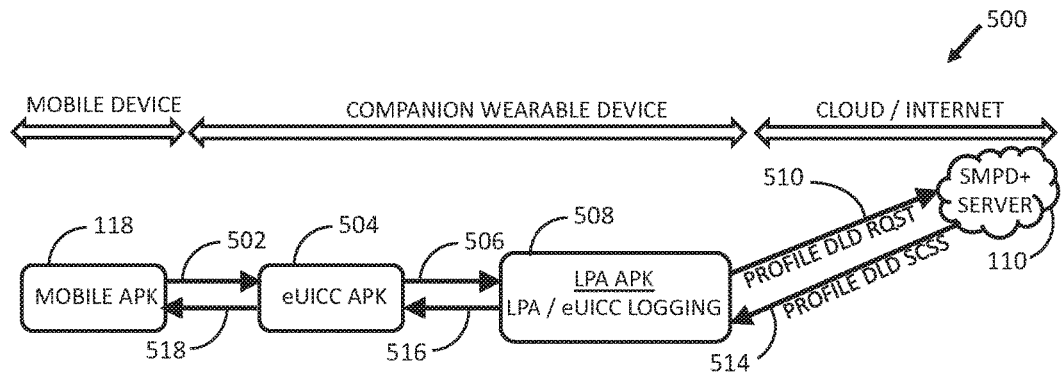
FIG. 5 illustrates an example flow of a process of SMDP+ server tapping and logging in an eUICC remote provisioning logging in one or more methods according to various implementations.

Referring to FIG. 5, operations in the flow 500 can start at 502 with the mobile APK 118 transmitting the logging request, for example, over the API Logging Interface 126 to the wireless companion device 104 interface to that API Logging Interface 126, an example of which is represented in FIG. 5 by eUICC APK 504. The eUICC APK 504 can include the FIG. 1 APK 124 or the FIG. 2 Micro App Service 204. The flow 500 can then proceed to 506 where the eUICC APK 504 can route the logging request, over an AIDL interface, to the LPA APK aspect of the LPA APK/LPA/eUICC Logging logic 508. The flow 500 can then proceed to 510, where the LPA/eUICC Logging logic 508 can route the logging request, with an LPA profile download message, to the SMDP+ server resource 110. The routing can be, for example, over the Internet or another cloud-type wide-area network. Upon the SMDP+ server resource 110 receiving the logging request, the flow 500 can proceed to 514, where the SMDP+ server resource 110 can send its response to the LPA APK aspect of the LPA APK/LPA/eUICC Logging logic 508. The response at 514 can include a LPA profile download response message with LPA name. The flow 500 can then proceed to 516 and apply additional operations, such the LPA APK/LPA/eUICC Logging logic 508 routing the LPA profile download response message with LPA to the eUICC APK 504. The flow 500 can then proceed to 518 where the eUICC APK 504 sends that response, e.g., over the API Logging Interface 126, to the mobile APK 118, which is the original sender of the logging request. Referring to FIGS. 1 and 5, upon the mobile APK 118 receiving the response, the mobile APK 118 can load the response into the log buffer 130 for subsequent operations, such as display through the UI 120.

Referring to FIGS. 4 and 5, operations in the FIG. 5 transmission at 502 of the logging request from the mobile APK 118 to the eUICC APK 504 can include transmission 424 of the "Profile Download" (abbreviated in FIG. 4 as "PROFILE DL") from the mobile APK 118 to the eUICC APK 418 (e.g., the FIG. 1 APK 124 or FIG. 2 Micro App Service 204). Example operations in routing at 506 of the logging request to the LPA APK aspect of the LPA APK/LPA/eUICC Logging logic 508 can include the FIG. 4 routing at 426 of PROFILE DL from the eUICC APK 418 to the LPA APK 428, combined with the routing at 430 of PROFILE DL from the LPA APK 428 to the LPA Service 432. Example operations in routing at 510 of the PROFILE DL RAST from the LPA APK/LPA/eUICC Logging logic 508 to the SMDP+ server resource 110 can include, referring to FIG. 4, the routing at 434 of PROFILE DL from the LPA Service 432 to the SMDP+ server resource 110.

Referring to the sending at 514 of the SMDP+ server resource 110 response to the logging request, the sending being to the LPA APK aspect of the LPA APK/LPA/eUICC Logging logic 508, operations can include the FIG. 4 sending at 436 of the LDA PROFILE DOWNLOAD (abbreviated LDA PFL DL) to the LPA Service 432. The LPA APK/LPA/eUICC Logging logic 508 can respond, as described above, with LPA KPIs, messages and events. Subsequent operations can include routing at 516 of the LPA KPIs, messages and events received from the LPA APK/LPA/eUICC Logging logic 508 to the eUICC APK 506, and then to the mobile APK 118. Referring to FIG. 4, exemplary operations in the above-described routing can include the FIG. 4 routing at 440 of the LPA PROFILE DOWNLOAD from the LPA Service 432 to the LPA 428, followed by the routing at 442 of the LPA PROFILE DOWNLOAD from the LPA 428 to the eUICC APK 418, and then the routing at 444 of the LPA PROFILE DOWNLOAD from the eUICC APK 418 to the mobile APK 118.

Figure 6:
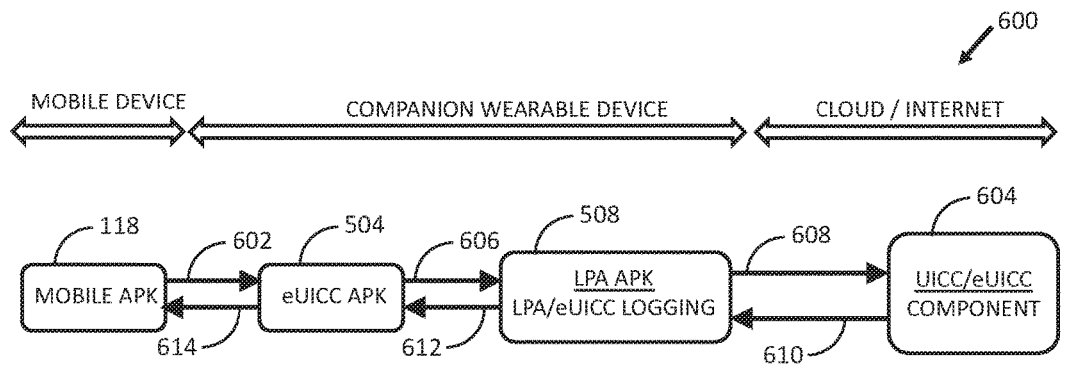
FIG. 6 illustrates an example flow of a process of eUICC/UICC logging in a virtual SIM card local provisioning logging system and in one or more methods according to various implementations.

Technical solutions provided by disclosed systems and methods can include providing a user of the primary wireless communication device 102 with an effective tapping into eUICC/UICC components and collecting, from such components, various KPIs, as well as messages and events that can further transform into relevant ones of such KPIs. An implementation providing examples of such tapping of eUICC/UICC components for various KPIs and associated messages and events will be described in reference to a flow 600 such as illustrated in FIG. 6. Description of certain example operations illustrated in FIG. 6 will include reference to FIG. 4.

Referring to FIG. 6, operations in the flow 600 can start at 602 with the mobile APK 118 transmitting a logging request destined for the illustrated "UICC/eUICC component" 604. The example implementation of the UICC/eUICC component 604 can include the FIG. 1 virtual SIM 106 and the FIG. 2 eUICC 206. The logging request transmitted at 602 being destined for the UICC/eUICC component 604, can first be received and routed at 606 by the eUICC APK 504 toward the LPA APK aspect of the LPA APK/LPA/eUICC Logging logic 508. As described in reference to FIG. 5, an implementation of LPA APK/LPA/eUICC Logging logic 508 can include the FIG. 2 LPA Service 210, and LPA-eUICC interface 216 and portions of LPA-SMDP+ interface 218. The "LPA APK aspect" can correspond, for example, to the LPA Service 210. In an implementation, the flow 600 can then proceed to 608 where the LPA APK aspect (e.g., LPA Service 210) of the LPA APK/LPA/eUICC Logging logic 508 can route the logging request over the Internet/Cloud to the UICC/eUICC component 604. The routing at 608 can be over the FIG. 1 provisioning uplink 114, through the Internet/Cloud 112, then to the UICC/eUICC component 604.

Referring to FIG. 6, upon the routing at 608, the flow 600 can proceed to 610, where the SMDP+ server resource 110 can send its response, for example, over the FIG. 1 provisioning downlink channel, to the LPA APK (e.g., LPA Service 210) of the LPA APK/LPA/eUICC Logging logic 508. Associated with 610, the LPA APK/LPA/eUICC Logging logic 508 can apply for the eUICC/UICC KPIs, messaged and events, whereupon the flow 600 can proceed to 612 where the LPA APK aspect of the LPA APK/LPA/eUICC Logging logic 508 can route the eUICC/UICC KPIs, messages and events to the eUICC APK 504. After 612, flow 600 can proceed to 614 where the eUICC APK 504 can route the eUICC/UICC KPIs, messages and events to the originator of the logging request at 602, which can be the mobile APK 118 of the primary wireless communication device 102.

Referring to FIGS. 1 and 6, the mobile APK 118, upon receiving the eUICC/UICC KPIs and messages can load the eUICC/UICC KPIs and messages, as logging information, into the log buffer 130 for subsequent operations, such as display through the UI 120.

Referring to FIGS. 4 and 6, example operations in the FIG. 6 transmission at 602 of the logging request from the mobile APK 118 to the eUICC APK 504 can include transmission at 448 of the "eUICC APDU Logging Request" from the mobile APK 118 to the eUICC APK 418 (e.g., the FIG. 1 APK 124 or FIG. 2 Micro App Service 204). Example operations in the routing at 606 can include a routing, at 450, of the eUICC APDU Logging from the eUICC APK 418 to the LPA APK 428. Example operations in the routing at 608 can include the FIG. 4 routing at 452 of the eUICC APDU Logging from the LPA APK 428 to the LPA Service 432, coupled with the sending at 454 of the eUICC APDU Logging Request from the LPA Service 432 to the UICC/eUICC component. Example operations in the above-described sending by the UICC/eUICC component 604 sending its response at 610 can include transmission at 456 of eUICC APDU Logging Reply from the SMDP+ server resource 110 to the LPA APK aspect (e.g., LPA Service 210) of the LPA APK/LPA/eUICC Logging logic 508. Operations included in the routing at 612 can include the FIG. 4 routing, at 460, of the eUICC APDU Logging Response, from the LPA Service 432 to the LPA APK 428, followed by the routing, at 462, of the eUICC APDU Logging Response from LPA APK 428 to the eUICC APK 418. Operations in FIG. 5 routing at 518 can include the FIG. 4 routing at 464 of the KPIs, messages and events to the originator of the logging request at 502, which can be the mobile APK 118 of the primary wireless communication device 102.

The above-described operations provide a technical solution to the technical problem of diagnosing, testing and verifying remote provisioning that includes proving a user of the primary wireless communication device 102 an effective tapping into eUICC remote provisioning servers, such as the SMDP+ server resource 110 to obtain, for example, KPIs as well as specifiable kinds of message and events that can affect or transform into relevant subsequent KPIs.

An implementation providing the above-described tapping of KPI information in SMDP+ server resources will be described in reference to FIG. 7. Various exemplary operations will then be described in reference to FIG. 4.

Figure 7:
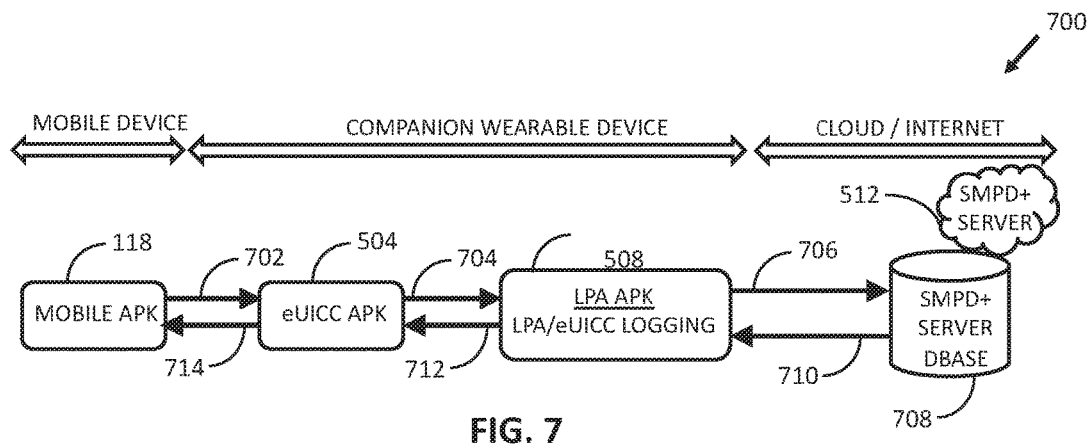
FIG. 7 illustrates an example flow of a process of local profile assistant logging in a virtual SIM card local provisioning logging system and in one or more methods according to various implementations.

Referring to FIG. 7, operations in the flow 700 can start at 702 with the mobile APK 118 transmitting the logging request, for example, over the API Logging Interface 126 to the wireless companion device 104 interface to that API Logging Interface 126, which is represented by the FIG. 7 instance of eUICC 504. As described in reference to FIGS. 5 and 6, logical implementations of eUICC APK 504 can include the FIG. 1 APK 124 or the FIG. 2 Micro App Service 204. In response, the flow 700 can proceed to 704 where the eUICC APK 504 can route the logging request, over an AIDL interface, to the LPA APK aspect of the LPA APK/LPA/eUICC Logging logic 508. The flow 700 can proceed to 706, where the LPA/eUICC Logging logic 508 can apply operations routing the logging request 704 to the SMDP+ server resource 110, for example, over the Internet or other cloud-type wide-area network. Upon the SMDP+ server resource 110 receiving the logging request the flow 700 can proceed to 708, where the SMDP+ server resource 110 can send its response to that logging request 704 back to the LPA APK aspect of the LPA APK/LPA/eUICC Logging logic 508. The LPA APK/LPA/eUICC Logging logic 508 that can then apply (not separately visible in FIG. 7) to the SMDP+ server resource 110 for LPA-related KPI's, messages and events. In an example operation, the flow 700 can then proceed to 710, where the LPA APK aspect of the LPA APK/LPA/eUICC Logging logic 508, upon receiving the SMDP+ server resource 110 response, can route the response to the eUICC APK 506. The flow 700 can then proceed to 712 where the eUICC APK 504 can send that response, e.g., over the API Logging Interface 126, to the mobile APK 118, which is the original sender of the logging request. Referring to FIGS. 1 and 7, upon the mobile APK 118 receiving the SMDP+ server resource 110 response, the mobile APK 118 can load the response into the log buffer 130 for subsequent operations, such as display through the UI 120.

Referring to FIGS. 4 and 7, operations in the FIG. 7 transmission at 702 of the logging request from the mobile APK 118 to the eUICC APK 504 can include transmission 468 of the "SMDP+ Request" from the mobile APK 118 to the eUICC APK 418 (e.g., the FIG. 1 APK 124 or FIG. 2 Micro App Service 204). Example operations in routing at 704 of the logging request to the LPA APK aspect of the LPA APK/LPA/eUICC Logging logic 508 can include a routing, at 470, of the SMDP+ Request from the eUICC APK 418 to the LPA APK 428. Example operations in routing at 706, of the SMDP+ Request from the LPA APK aspect of the LPA APK/LPA/eUICC to the SMDP+ server resource 110 can include the FIG. 4 routing at 472 of the SMDP+ Request from the LPA APK 428 to the LPA Service 432, coupled with the routing at 474 of the SMDP+ Request from the LPA Service 432 to the SMDP+ server resource 110. Example operations in the sending at 708 of the SMDP+ server resource 110 response to the logging request 704, back to the LPA APK aspect of the LPA APK/LPA/eUICC Logging logic 508, can include the FIG. 4 sending at 476 of the SMDP+ Logging Response (to the Request at 474) to the LPA Service 432.

In an implementation, operations in the FIG. 7 routing at 712 of the SMDP+ server 110 response's KPI's, messages and events to the eUICC APK 504, and subsequent routing at 714 of the SMDP+ server resource 110 responses to the mobile APK 118 can include the FIG. 4 routing at 480 of the SMDP+ LOGGING RESPONSE/EVENT, from the LPA Service 432 to the mobile APK 118. In addition, operations in the FIG. 4 "SMPDP+ SKPI DISPLAY" 482 can be an example implementation of the above described receiving at the mobile APK 118 of the SMDP+ server resource 110 response, combined with the mobile APK 118 loading the response into the log buffer 130 for subsequent operations, such as display through the UI 120.

Figure 8:
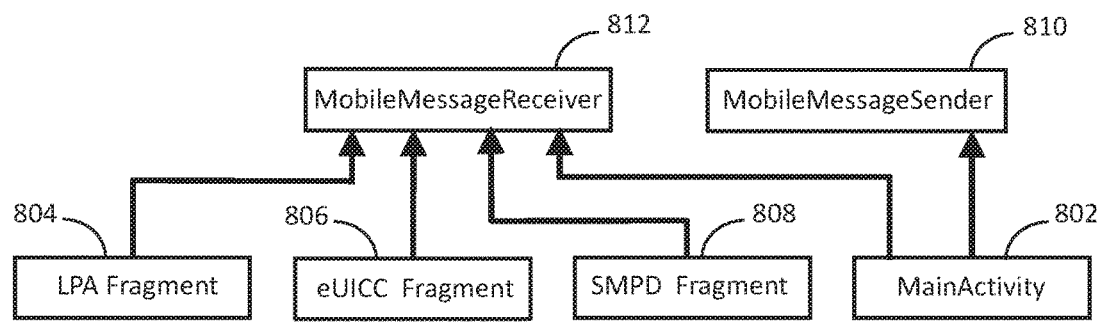
FIG. 8 is a diagram graphically illustrating one fragment level architecture providing interfaces to eUICC local provisioning modules in a companion device configured within an example eUICC local provisioning logging system, and in one or more methods according to various implementations.
Figure 12:
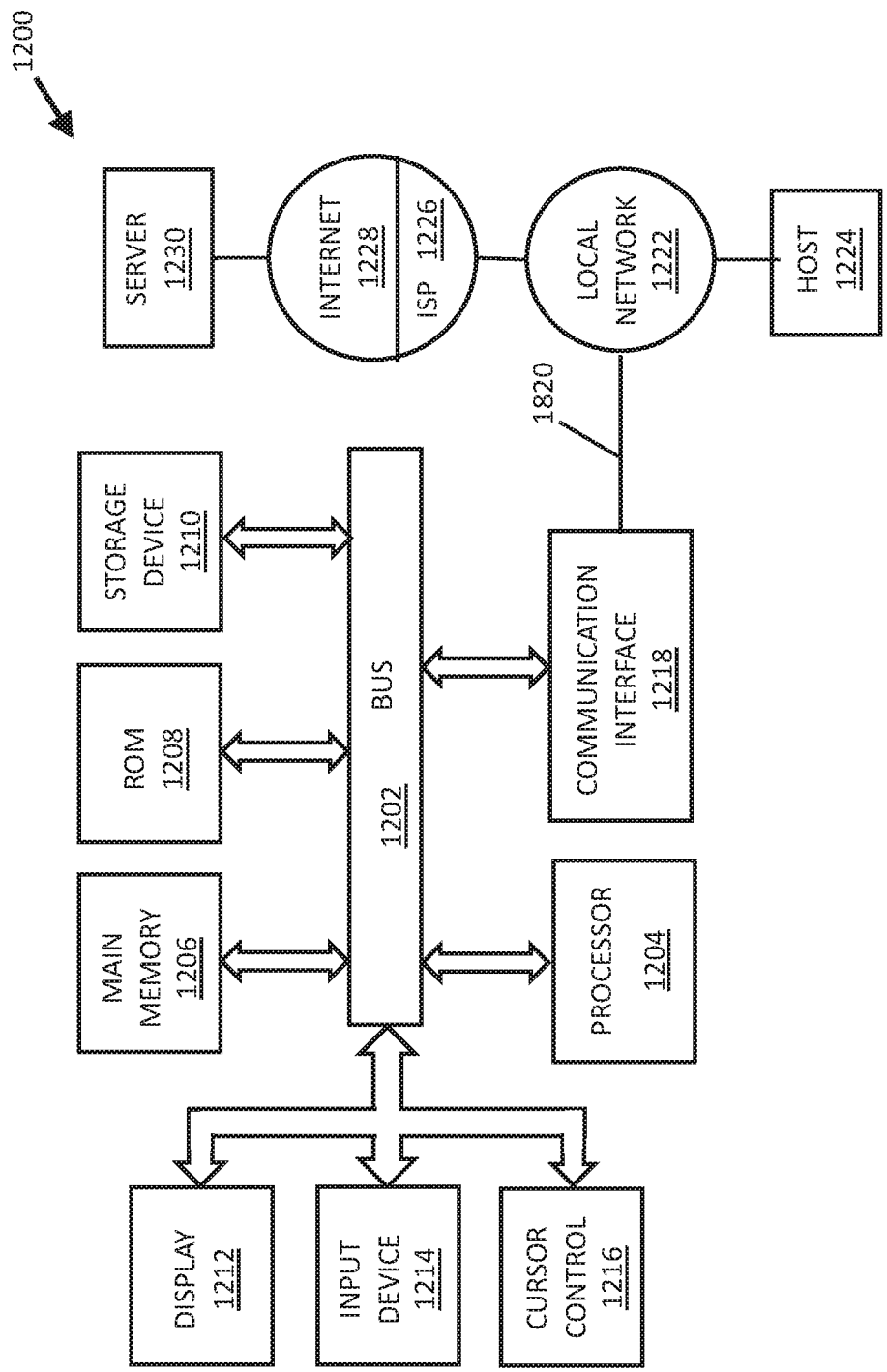
FIG. 12 is a block diagram illustrating an architecture of a computer system upon which aspects of this disclosure may be implemented.

FIG. 8 shows a diagram illustrating an example architecture of components that can be installed, for example, as modules in memory resources of a programmable processor of the primary wireless communication device 102, for example, in accordance with the FIG. 12 illustration and described in greater detail later in this disclosure. In an implementation, an architecture as illustrated in FIG. 8 can include a Main Activity component 802, which can be configured to create all user interface (UI) components, and can include an LPA Fragment 804 that can be configured to represent LPA events as, for example, a list of profiles and transaction commands. An example implementation of an architecture according to FIG. 8 can also include an eUICC Fragment 806, which can be configured to represent eUICC related events that will be recorded, for example, via FIG. 2 API 202, and can include SMPD Fragment 808, which can be configured to represent SMPD+ server-related activities that will be recorded, for example, via FIG. 2 API 202. An example implementation of an architecture according to FIG. 8 can also include MobileMessageSender component 810, which can be configured to provide an interface to send messages carrying various logging commands from the primary wireless communication device 102 to the wireless companion device 104. Referring to FIG. 8, an implementation of an architecture as illustrated in FIG. 8 can also include MobileMessageReceiver 812, which can be configured to provide interface to obtain wear commands, and route them to proper components.

Figure 9:
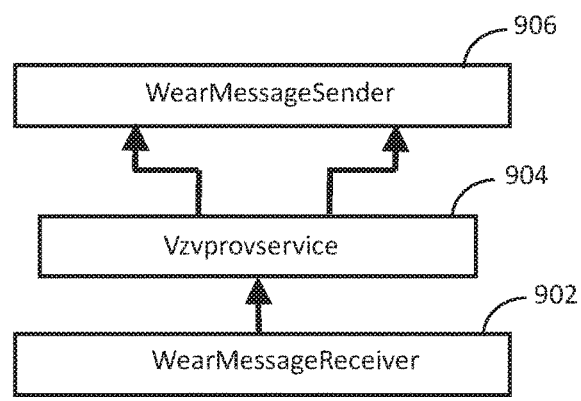
FIG. 9 shows a diagram graphically illustrating one fragment level architecture providing collection of certain provisioning-related information associated with provisioning a virtual SIM card in a companion device, in an exemplary eUICC local provisioning logging system and in one or more methods according to various implementations.

FIG. 9 shows a diagram illustrating an example architecture of components that, according to various implementations, can be installed, for example, as modules in memory resources of a programmable processor of the wireless companion device 104, for example, in accordance with the FIG. 12 illustration and described in greater detail later in this disclosure. Referring to FIG. 9, in an implementation, components in an architecture as illustrated by the FIG. 9 diagram architecture can include WearMessageListenerService 902, ProvService 904, and WearMessageSender 906. According to an implementation, the WearMessageListenerService 902 can be configured as a service on an Android platform. In an aspect, the messages can be on a wear side from a smartphone, instead of handling messages directly and, therefore, can pass all messages to VzvprovService service. VzvprovService is a foreground service, configured to receive commands from a phone, put them to LPA service, get callbacks and send messages back to a smartphone. WearMessageSender 902 can be a class responsible for sending messages to a smartphone.

Figure 10:
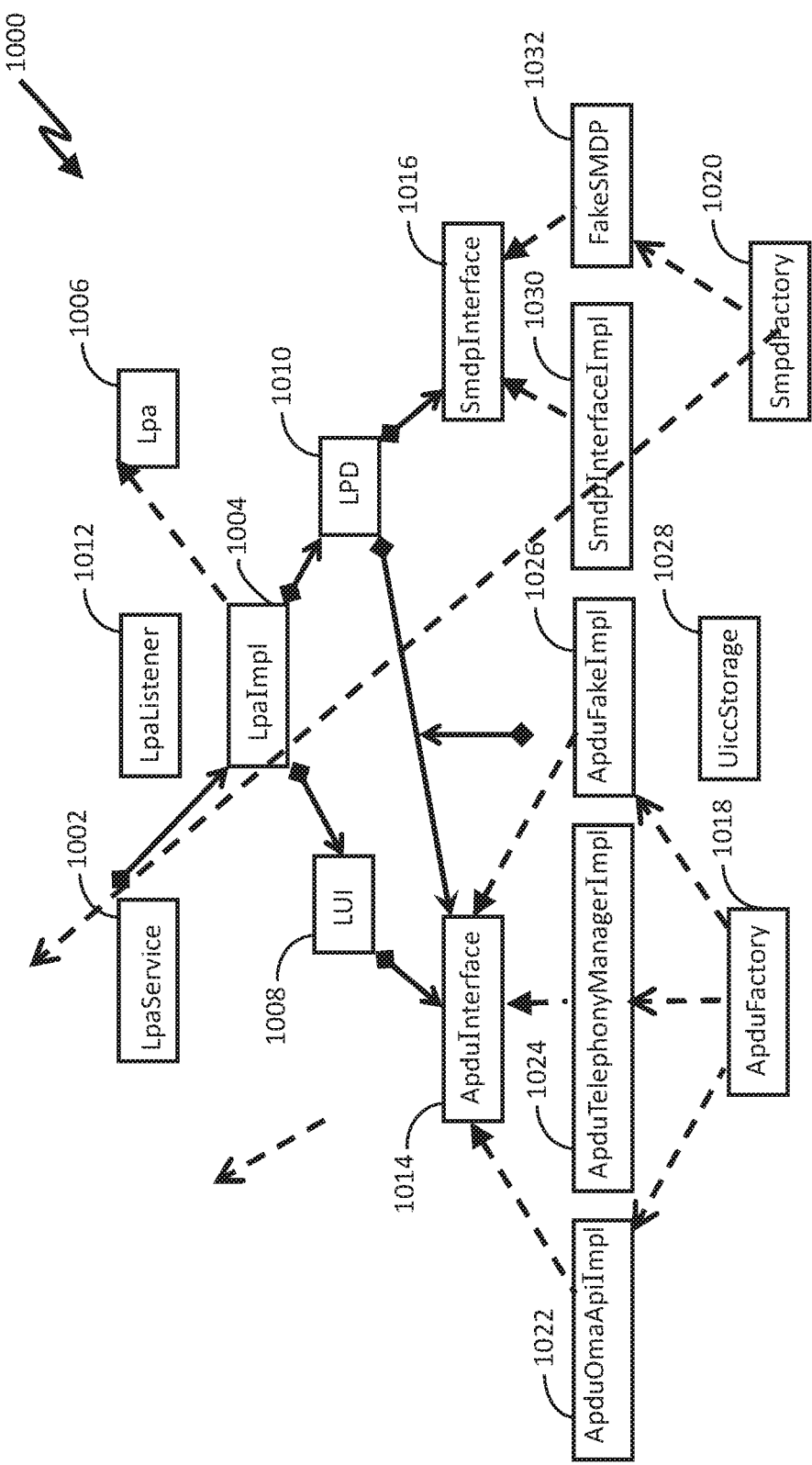
FIG. 10 shows a diagram illustrating one architecture of LPA services and eUICC provisioning event logging for a companion device within a remote eUICC provisioning logging systems and methods according to various implementations.

FIG. 10 shows a diagram 1000, graphically illustrating an example architecture of an installation, for example in the programmable processor resources of the FIG. 1 wireless companion device 104, of LPA services and eUICC provisioning logging aspects in one or more systems and methods according to this disclosure. Implementations or within architectures illustrated in FIG. 10 can comprise, for example, a service such as LpaService 1002 that can be configured to provide public LPA interfaces. In an aspect, architecture 1000 can also include a feature such as LpaImpl 1004, configured to implement LPA interfaces as represented by Lpa 1006. Associated with LpaImpl 1004 can be a module, such as LUI 1008, which can be configured to interact with the eUICC, e.g., the FIG. 2 eUICC 206. Also associated with LpaImpl 1004 can be a module such as LPD 1010, which can be configured to interact with an SMDP+ server, such as the SMDP+ server resource 110 of FIGS. 1 and 2. The LPD 1010 can be further configured to provide, referring to FIGS. 2 and 6, an inter-protocol interface between the ES9+ interface protocol and the ES10b/c interface protocol.

Referring to FIG. 10, one or more implementations according to the illustrated architecture can include an interface, such as "ApduInterface 1014," which can be configured to define interface to communicate with a wireless companion device eUICC, such as the FIG. 2 eUICC 206. Implementations according to the FIG. 10 illustrated architecture can also include an interface, such as "SmpdInterface 1016," which can be configured to define an interface to communicate with an SMDP+ server, such as the SMDP+ server resource 110 in FIGS. 1 and 2. Implementations according to the FIG. 10 illustrated architecture can include particular object creation factories configured to implement the above-described interfaces ApduInterface 1014 and SmpdInterface 1016. For example, an object creation factory such as the example "SmpdFactory 1020" can be included, having a configuration to create SmpdInterface 1016 and another object creation factory, such as the example "ApduFactory 1018," can be configured to create ApduInterface 1014. In an aspect, an object creation factory such as the example SmpdFactory 1020 can be further configured to support eUICC access using, for example, Open Mobile Alliance (OMA) API, or the Android service "TelephonyManager," or a fake implementation of eUICC.

Referring to FIG. 10, the block labeled "ApduOmaApiImpl" 1022 illustrates another example object that can be created by an object factory such as the ApduFactory 1018 to implement the ApduInterface 1014 with support for eUICC access using OMA API. The block labeled "ApduTelephonyManagerImpl" 1024 illustrates an example object that can be created by ApduFactory 1018 to implement, for example, the ApduInterface 1014 with support for the Android service TelephonyManager. The block labeled "ApduFakeImpl" 1026 illustrates one object that can be created by ApduFactory 1018 to implement, for example, the ApduInterface 1014 with support for fake implementation of eUICC, based on shared preferences, stored in a resource such as represented by the UiccStorage block 1028.

The block labeled "SmdpinterfaceImpl" 1030 illustrates an example object that can be created by SmpdFactory 1020 to implement SmpdInterface 1016 with capability to access SMDP+ servers, such as the SMDP+ server resource 110 in FIGS. 1 and 2. The block labeled "FakeSMDP" 1032 illustrates one example object that can be created by SmpdFactory 1020 to implement SmpdInterface 1016 with capability to implement hard coded SMDP+ server answers.

FIG. 11A-11G illustrate graphic arrangement for displaying exemplary logging of KPIs, profile and other information relating to events and states in and associated with remote provisioning of eUICCs in wireless companion devices, in one or more exemplary processes in systems and methods according to various implementation.

Figure 11B:
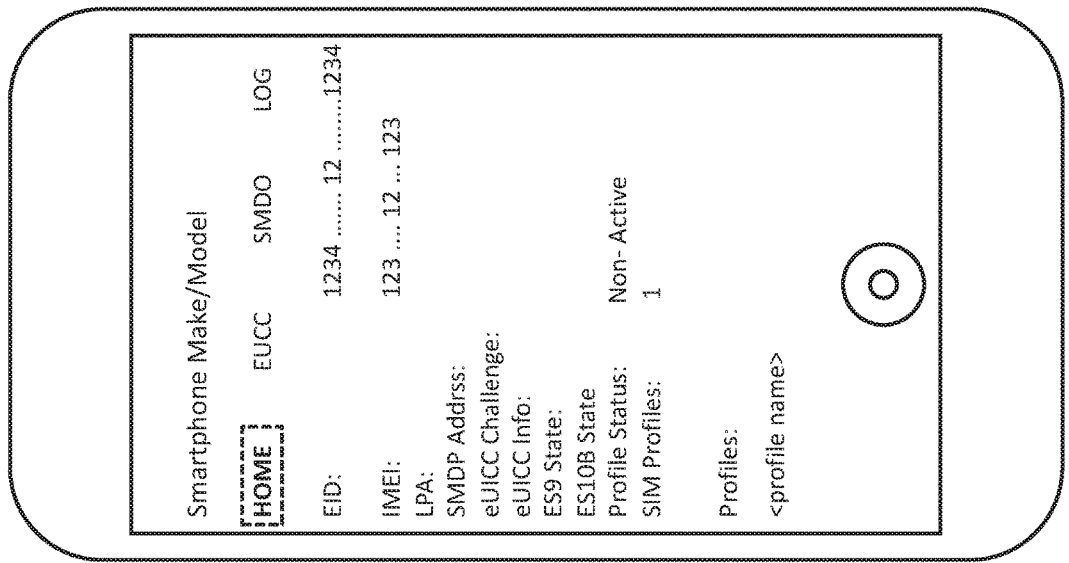
Figure 11A:
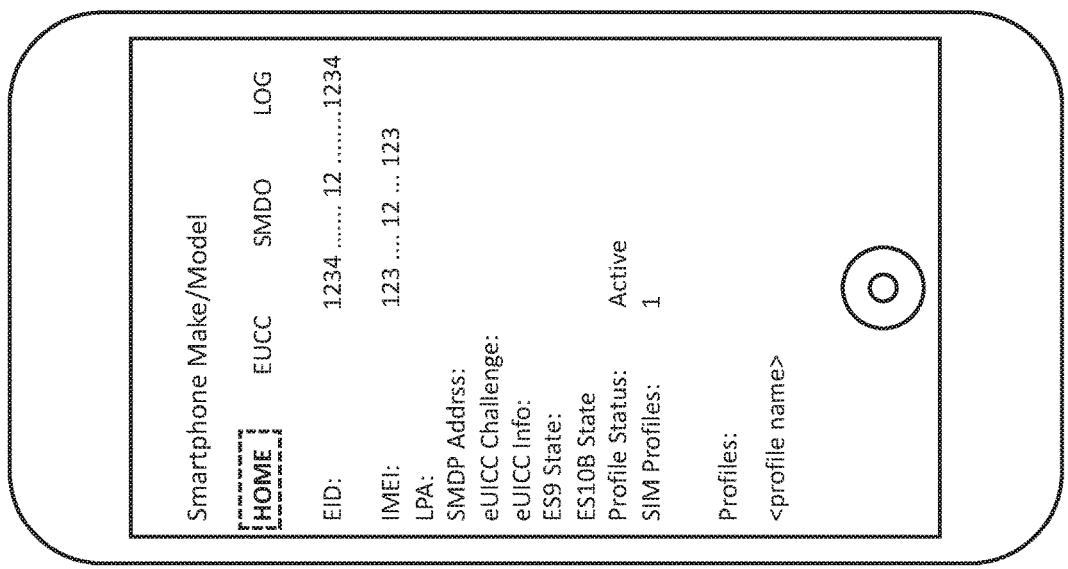

FIG. 11A illustrates example graphic arrangement for displaying, on a primary wireless communication device, exemplary logging data and information associated with remote provisioning an eUICC of a wireless companion device, in an exemplary process associated with eUICC remote provisioning logging, in systems and methods according to various implementations.

FIG. 11B illustrates one example graphic arrangement for displaying, on the primary wireless communication device, exemplary logging of KPIs and other information associated with remote provisioning the wireless companion device eUICC, in association with a non-active profile, in an exemplary process associated with eUICC remote provisioning logging, in systems and methods according to various implementations.

Figure 11D:
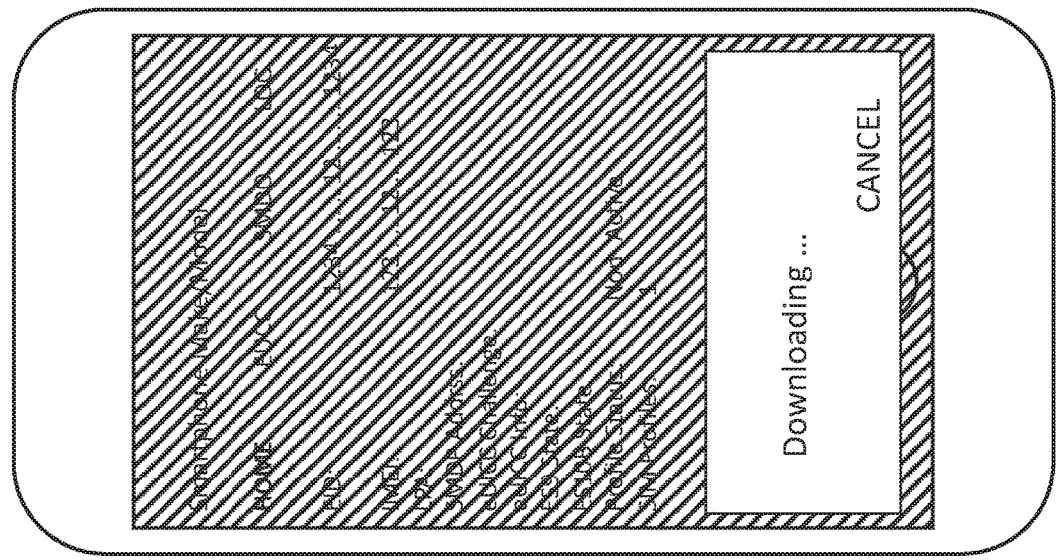
Figure 11C:
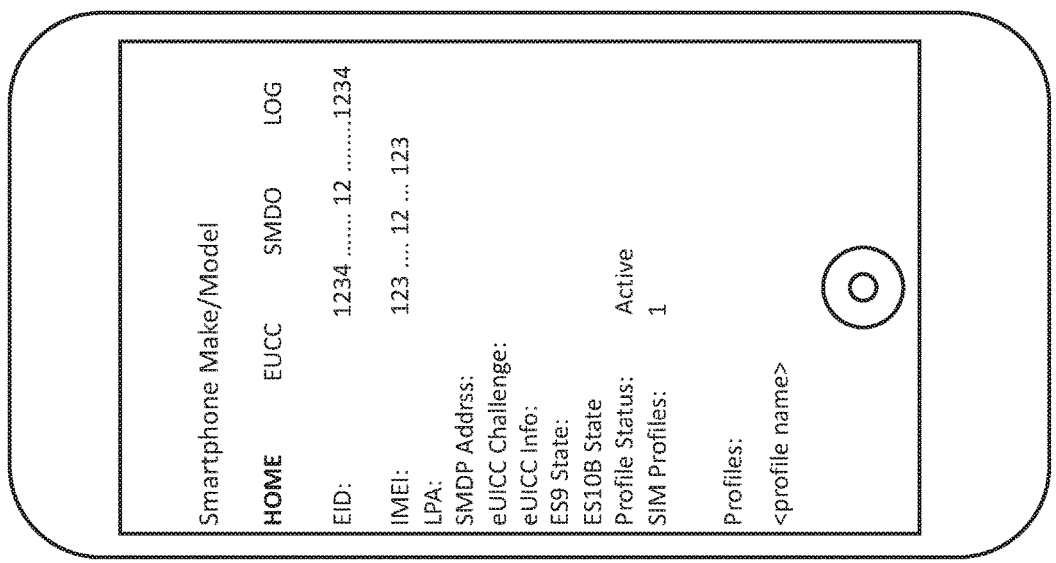

FIG. 11C illustrates one example graphic arrangement for displaying, on the primary wireless communication device, exemplary logging of real time KPIs and other real-time information associated with remote provisioning the wireless companion device eUICC, in association with a non-active profile, in an exemplary process associated with eUICC remote provisioning logging, in systems and methods according to various implementations.

FIG. 11D illustrates one example graphic arrangement for displaying exemplary logging of data associated with an example downloading of a profile, in an exemplary process associated with eUICC remote provisioning logging, in systems and methods according to various implementations.

Figure 11F:
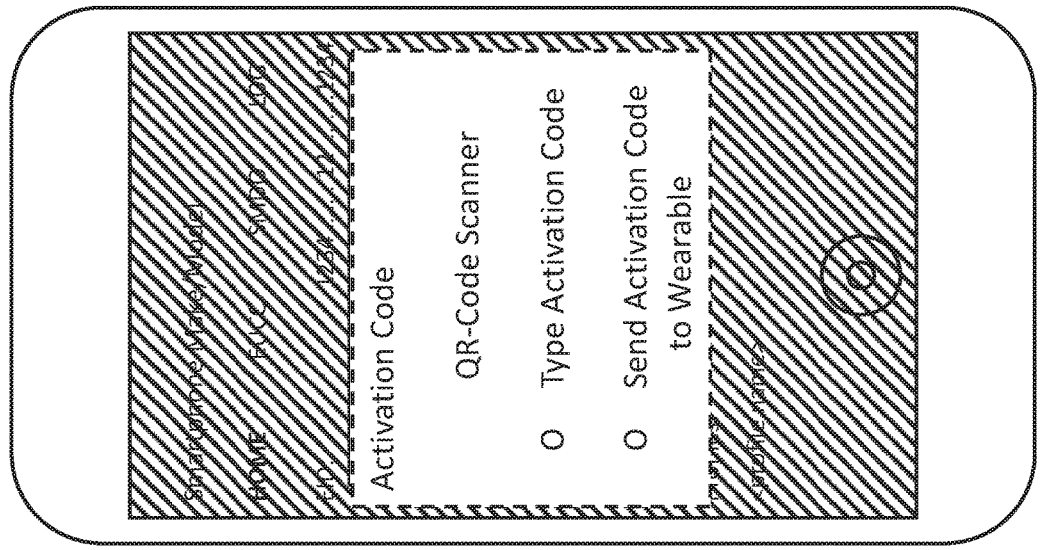
Figure 11E:
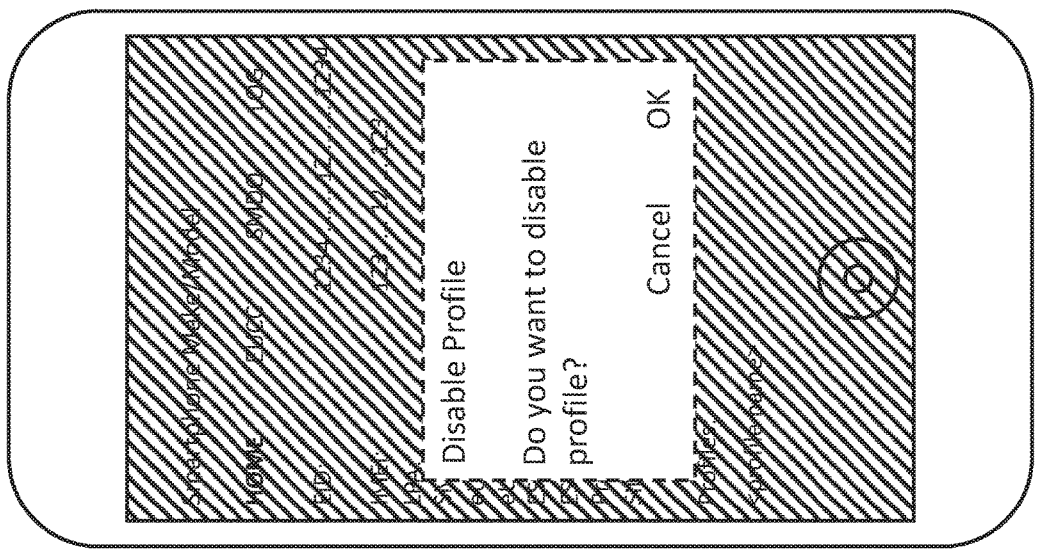

FIG. 11E illustrates one example graphic arrangement in a graphical user interface, on a primary wireless communication device, in a process providing user-controlled disabling of a currently active profile on an eUICC, in an exemplary process associated with eUICC remote provisioning logging, in systems and methods according to various implementations.

FIG. 11F illustrates one example graphic arrangement in a graphical user interface, on a primary wireless communication device, in a process providing user-controlled selection and entry of an activation code for activating a profile, in an exemplary process associated with eUICC remote provisioning logging, in systems and methods according to various implementations.

Figure 11G:
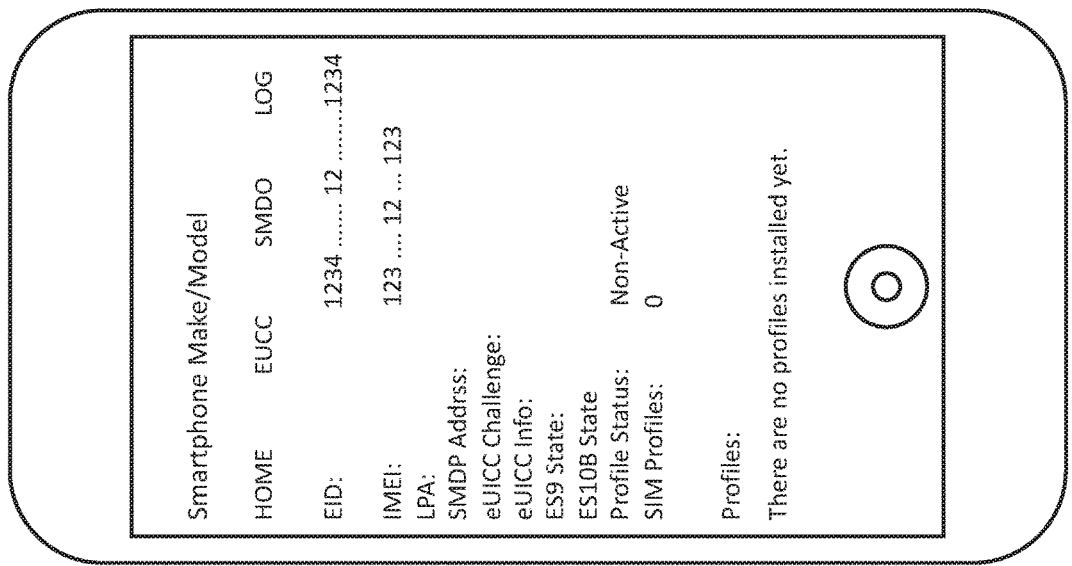

FIG. 11G illustrates one example graphic arrangement in a graphical user interface, on a primary wireless communication device, indicating a state of no profiles yet provisioned on a virtual SIM card of the primary device's wireless companion device, in an exemplary process associated with eUICC remote provisioning logging, in systems and methods according to various implementations.

FIG. 12 is a block diagram illustrating aspects of a computer system 1200 upon which aspects of this disclosure may be implemented, including but not limited to processes described in reference to FIGS. 4, 5, and 7. Computer system 1200 may include a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 may be used for storing temporary variables or other intermediate information during execution of instructions to be executed by processor 1204. Computer system 1200 can include a read only memory (ROM) 1208 or other static storage device coupled to bus 1202 for storing static information and instructions for processor 1204. A storage device 1210, such as a magnetic disk or optical disk, can be coupled to bus 1202 for storing information and instructions.

Computer system 1200 may be coupled via bus 1202 to a display 1212, such as a cathode ray tube (CRT) or liquid crystal display (LCD), for displaying information to a computer user. An input device 1214, including alphanumeric and other keys, can be coupled to bus 1202 for communicating information and command selections to processor 1204. A cursor control 1216, such as a mouse, a trackball, or cursor direction keys can be included, for communicating cursor direction information and command selections to processor 1204 and for controlling cursor movement on display 1212. The cursor control 1216 can provide two degrees of freedom in two axes, a first axis (e.g., x) and a second axis (e.g., y), that allows the device to specify positions in a plane. In an aspect, a touchscreen (not separately visible in FIG. 12) can combine display 1212 with hardware that registers touches upon display 1212.

In an aspect, processor 1204 can execute one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 1200, various machine-readable media are involved, for example, in providing instructions to processor 1204 for execution. Such a medium may take many forms, including but not limited to, non-volatile media, volatile media, and transmission media. Non-volatile media includes, for example, optical or magnetic disks. Volatile media includes such dynamic memory. Transmission media includes coaxial cables, copper wire and fiber optics, including the wires that comprise bus 1202. Transmission media can also take the form of acoustic or light waves, such as those generated during radio wave and infrared data communications. All such media must be tangible to enable the instructions carried by the media to be detected by a physical mechanism that reads the instructions into a machine.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over, for example, a telephone line using a modem. A modem local to computer system 1200 can receive the data on the telephone line and use, for example, an infrared transmitter to convert the data to an infrared signal. An infrared detector can receive the data carried in the infrared signal and appropriate circuitry can place the data on bus 1202. Bus 1202 can carry the data to main memory 1206, from which processor 1204 retrieves and executes the instructions. The instructions received by main memory 1206 may optionally be stored on storage device 1210 either before or after execution by processor 1204.

Computer system 1200 can include a communication interface 1218 coupled to bus 1202, to provide a two-way data communication coupling to a network link 1220 that is connected to a local network 1222. The communication interface 1218 may be, for example, an integrated services digital network (ISDN) card or a modem to provide a data communication connection to a corresponding type of telephone line.

Network link 1220 can provide data communication through one or more networks to other data devices. Network link 1220 may provide a connection through local network 1222 to a host computer 1224 or to data equipment operated by an Internet Service Provider (ISP) 1226. ISP 1226 can provide data communication services through "Internet" 1228. A server 1230 can be connected to the Internet 1228. Local network 1222 and Internet 1228 can use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. The received code can be executed by processor 1204 as it is received, and/or stored in storage device 1210, or other non-volatile storage for later execution. Computer system 1200 may obtain such code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing in this disclosure is intended as, or should be interpreted to cause a dedication of any component, step, feature, object, benefit, advantage, or equivalent to the public, regardless of whether it is or is not recited in the claims.

It will be understood that terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any relationship or order between such entities or actions. The terms "comprises," "comprising," and all other variations of "comprise" are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. The word "exemplary" is used herein to mean "serving as an example, instance, or illustration." Any implementation or variation described herein as "exemplary" is not necessarily to be construed as preferred or advantageous over other implementations and variations therefore.

The Abstract of the Disclosure is provided to allow the reader to quickly identify a nature of disclosed subject matter. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   establishing a wireless link between a first wireless communication device and a second wireless communication device, wherein the first wireless communication device supports an Embedded Universal Integrated Circuit Card (eUICC);
   receiving, at the first wireless communication device, a logging request from the second wireless communication device, the logging request including a request for provisioning information that includes eUICC provisioning information associated with remote provisioning of the eUICC;
   in response to receiving the logging request, the first wireless communication device applying to the eUICC for the eUICC provisioning information requested in the logging request;
   in response to applying for the requested eUICC provisioning information, receiving, from the eUICC, a response including received eUICC provisioning information; and
   upon receiving the response from the eUICC, the first wireless communication device routing to the second wireless communication device at least a portion of the received eUICC provisioning information.

2. The method of claim 1, further comprising:
   establishing a local provisioning application (LPA) in the first wireless communication device, the LPA interfacing to the eUICC,
   wherein the LPA performs the steps of receiving the logging request, applying to the eUICC, receiving the response from the eUICC, and routing to the second wireless communication device at least a portion of the received eUICC provisioning information.

3. The method of claim 1, further comprising establishing an application programming interface (API) over the wireless link, wherein the logging request is received by the first wireless communication device over the API, and wherein at least a portion of the received eUICC provisioning information is routed to the second wireless communication device over the API.

4. The method of claim 1, further comprising:
   receiving, at the first wireless communication device from the second wireless communication device, a request for remote provisioning server information associated with the remote provisioning, and
   applying, to a remote provisioning server through a channel carried by the wireless link, for the remote provisioning server information.

5. The method of claim 1, wherein the first wireless communication device is configured to be tested by the second wireless communication device.

6. The method of claim 1, wherein the first wireless communication device is a companion device to the second wireless communication device.

7. The method of claim 1, wherein the second wireless communication device is a smartphone connected to a wireless network provider over a cellular network, and the first wireless communication device is a wearable device.

8. The method of claim 1, wherein the wireless link is a local wireless communications link.

9. An apparatus, comprising:
an Embedded Universal Integrated Circuit Card (eUICC);
a processor configured to interface to the eUICC and to communicate with an external device; and
a memory storing executable instructions for causing the processor to:
receive, from the external device, a logging request that includes a request for eUICC provisioning information associated with remote provisioning of the eUICC;
in response to receiving the logging request, apply to the eUICC for the eUICC provisioning information requested in the logging request;
in response to applying for the requested eUICC provisioning information, receive, from the eUICC, a response including received eUICC provisioning information; and
upon receiving the response, route to the external device at least a portion of the received eUICC provisioning information.

10. The apparatus of claim 9, further comprising a local provisioning application (LPA) installed in the processor, wherein the LPA is configured to perform the steps of receiving the logging request, applying to the eUICC, receiving the response from the eUICC, and routing to the second wireless communication device at least a portion of the received eUICC provisioning information.

11. The apparatus of claim 9, wherein:
the processor is configured to communicate with the external device via an application program interface (API) carried by a wireless link to the external device,
the logging request is received over the API, and
the routing of at least a portion of the received eUICC provisioning information is over the API.

12. The apparatus of claim 9, wherein the memory further stores executable instructions for causing the processor to:
receive, from the external wireless communication device, a request for remote provisioning server information associated with the remote provisioning, and
apply, to a remote provisioning server through a channel carried by the wireless link, for the remote provisioning server information.

13. The apparatus of claim 9, wherein the apparatus is configured to be tested using the external device.

14. The apparatus of claim 9, wherein the apparatus is a companion device to the external device.

15. A method comprising:
establishing a wireless link between a first wireless communication device and a second wireless communication device, wherein the first wireless communication device supports an Embedded Universal Integrated Circuit Card (eUICC);
transmitting, from the second wireless communication device to the first wireless communication device, a logging request including a request for provisioning information that includes eUICC provisioning information associated with remote provisioning of the eUICC;
receiving, at the second wireless communication device from the eUICC via the first wireless communication device, a response to the logging request, the response including received eUICC provisioning information.

16. The method of claim 15, further comprising establishing an application programming interface (API) over the wireless link, wherein the logging request is transmitted to the first wireless communication device over the API, and wherein the response from the eUICC is received over the API.

17. The method of claim 15, further comprising prior to establishing the wireless link between the first wireless communication device and the second wireless communication device, the second wireless communication device detecting the first wireless communication device by performing a discovery operation.

18. The method of claim 15, wherein the second wireless communication device is configured to test the first wireless communication device.

19. The method of claim 15, wherein the first wireless communication device is a companion device to the second wireless communication device.

20. The method of claim 15, further comprising:
the second wireless communication device, upon receiving the response to the logging request, storing the received eUICC provisioning information in a buffer; and
the second wireless communication device retrieving from the buffer and displaying the received provisioning information.

* * * * *